US011341719B2

(12) United States Patent
Guizilini et al.

(10) Patent No.: US 11,341,719 B2
(45) Date of Patent: May 24, 2022

(54) SYSTEM AND METHOD FOR ESTIMATING DEPTH UNCERTAINTY FOR SELF-SUPERVISED 3D RECONSTRUCTION

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/869,341

(22) Filed: May 7, 2020

(65) Prior Publication Data

US 2021/0350616 A1    Nov. 11, 2021

(51) Int. Cl.
| | |
|---|---|
| *G06T 17/05* | (2011.01) |
| *G06T 7/55* | (2017.01) |
| *G06T 5/00* | (2006.01) |
| *G06N 3/08* | (2006.01) |
| *G06N 3/04* | (2006.01) |

(52) U.S. Cl.
CPC ............ *G06T 17/05* (2013.01); *G06N 3/04* (2013.01); *G06N 3/08* (2013.01); *G06T 5/002* (2013.01); *G06T 5/003* (2013.01); *G06T 7/55* (2017.01); *G06T 2200/08* (2013.01); *G06T 2207/10016* (2013.01); *G06T 2207/10028* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 10,109,104 | B2 * | 10/2018 | Newman | ............ H04N 5/2253 |
| 2019/0066326 | A1 * | 2/2019 | Tran | ...................... G06F 16/29 |
| 2019/0356905 | A1 * | 11/2019 | Godard | ................. G06T 7/593 |

(Continued)

FOREIGN PATENT DOCUMENTS

| | | |
|---|---|---|
| WO | 2017115149 A1 | 7/2017 |
| WO | 2019180414 A1 | 9/2019 |

OTHER PUBLICATIONS

Bertoni, et al., "MonoLoco: Monocular 3D Pedestrian Localization and Uncertainty Estimation", arXiv: 1906.06059, Aug. 20, 2019.

(Continued)

*Primary Examiner* — Jeffrey J Chow
(74) *Attorney, Agent, or Firm* — Seyfarth Shaw LLP (57) ABSTRACT

A method is presented. The method includes estimating an ego-motion of an agent based on a current image from a sequence of images and at least one previous image from the sequence of images. Each image in the sequence of images may be a two-dimensional (2D) image. The method also includes estimating a depth of the current image based the at least one previous image. The estimated depth accounts for a depth uncertainty measurement in the current image and the at least one previous image. The method further includes generating a three-dimensional (3D) reconstruction of the current image based on the estimated ego-motion and the estimated depth. The method still further includes controlling an action of the agent based on the three-dimensional reconstruction.

20 Claims, 7 Drawing Sheets

(56) References Cited

U.S. PATENT DOCUMENTS

| | | | |
|---|---|---|---|
| 2020/0160546 A1* | 5/2020 | Gu | G06N 3/08 |
| 2020/0167943 A1* | 5/2020 | Kim | G06T 7/174 |
| 2020/0218979 A1* | 7/2020 | Kwon | B60W 60/0011 |
| 2020/0257301 A1* | 8/2020 | Weiser | G05D 1/0214 |
| 2020/0327685 A1* | 10/2020 | Ren | G06K 9/6267 |

OTHER PUBLICATIONS

Ma, et al., "Depth Estimation from Monocular Images Using Dilated Convolution and Uncertainty Learning", Advances In Multimedia Information Processing—PCM 2018, Sep. 19, 2018.

Kendall, et al., "Multi-Task Learning Using Uncertainty to Weigh Losses for Scene Geometry and Semantics", arXiv: 1705.07115, Apr. 28, 2018.

* cited by examiner

SYSTEM AND METHOD FOR ESTIMATING DEPTH UNCERTAINTY FOR SELF-SUPERVISED 3D RECONSTRUCTION

BACKGROUND

Field

Certain aspects of the present disclosure generally relate to scene reconstruction systems.

Background

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. It is desirable to improve the accuracy of a 3D representation constructed from one or more images captured by the autonomous agent.

SUMMARY

In one aspect of the present disclosure, a method is disclosed. The method includes estimating an ego-motion of an agent based on a current image from a sequence of images and one or more previous image from the sequence of images. The method also includes estimating a depth of the current image based on the one or more previous images. The method further includes generating a 3D reconstruction of the current image based on the estimated ego-motion and the estimated depth. The method still further includes controlling an action of the agent based on the three-dimensional reconstruction.

In another aspect of the present disclosure, a non-transitory computer-readable medium with non-transitory program code recorded thereon is disclosed. The program code is executed by a processor and includes program code to estimating an ego-motion of an agent based on a current image from a sequence of images and one or more previous image from the sequence of images. The program code also includes program code to estimate a depth of the current image based on the one or more previous images. The program code further includes program code to generate a 3D reconstruction of the current image based on the estimated ego-motion and the estimated depth. The program code still further includes program code to control an action of the agent based on the three-dimensional reconstruction.

Another aspect of the present disclosure is directed to an apparatus. The apparatus having a memory, one or more processors coupled to the memory, and instructions stored in the memory. The instructions being operable, when executed by the processor, to cause the apparatus to estimate an ego-motion of an agent based on a current image from a sequence of images and one or more previous image from the sequence of images. The instructions also cause the apparatus to estimate a depth of the current image based on the one or more previous images. The instructions additionally cause the apparatus to generate a 3D reconstruction of the current image based on the estimated ego-motion and the estimated depth. The instructions further cause the apparatus to control an action of the agent based on the three-dimensional reconstruction.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

The ability to perceive distances through depth estimation based on sensor data provides an ability to plan/estimate ego-motion through the environment. However, depending on the available onboard sensors, the agent may acquire a limited perspective of the environment. As a result, the agent may encounter difficulties in distinguishing aspects of the environment.

That is, various sensors perceive aspects of the environment differently and have different implementation characteristics. For example, LiDAR (light detection and ranging) provides improved depth perception but may encounter errors in certain weather conditions. Other sensors, such as stereo cameras, may capture depth information but may have a limited field-of-view. Monocular cameras may be cost-effective, however, the sensor data does not explicitly include depth information.

In some cases, an agent implements processing routines for deriving depth information from the monocular images. For example, conventional depth networks generate 3D representations based on hand-engineered features. That is, the depth network may be trained to estimate depth via labeled data (e.g., supervised training).

Deep learning approaches, such as self-supervised learning, may eliminate hand-engineered features (e.g., labeled data) and improve depth estimates as well as 3D model reconstruction. For example, deep learning approaches improve the reconstruction of textureless regions and/or geometrically under-determined regions. Aspects of the present disclosure are directed to improving depth estimates and single-image scene reconstruction via self-supervised learning. More specifically, aspects of the present disclosure improve depth estimates by accounting for depth uncertainty.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 1:
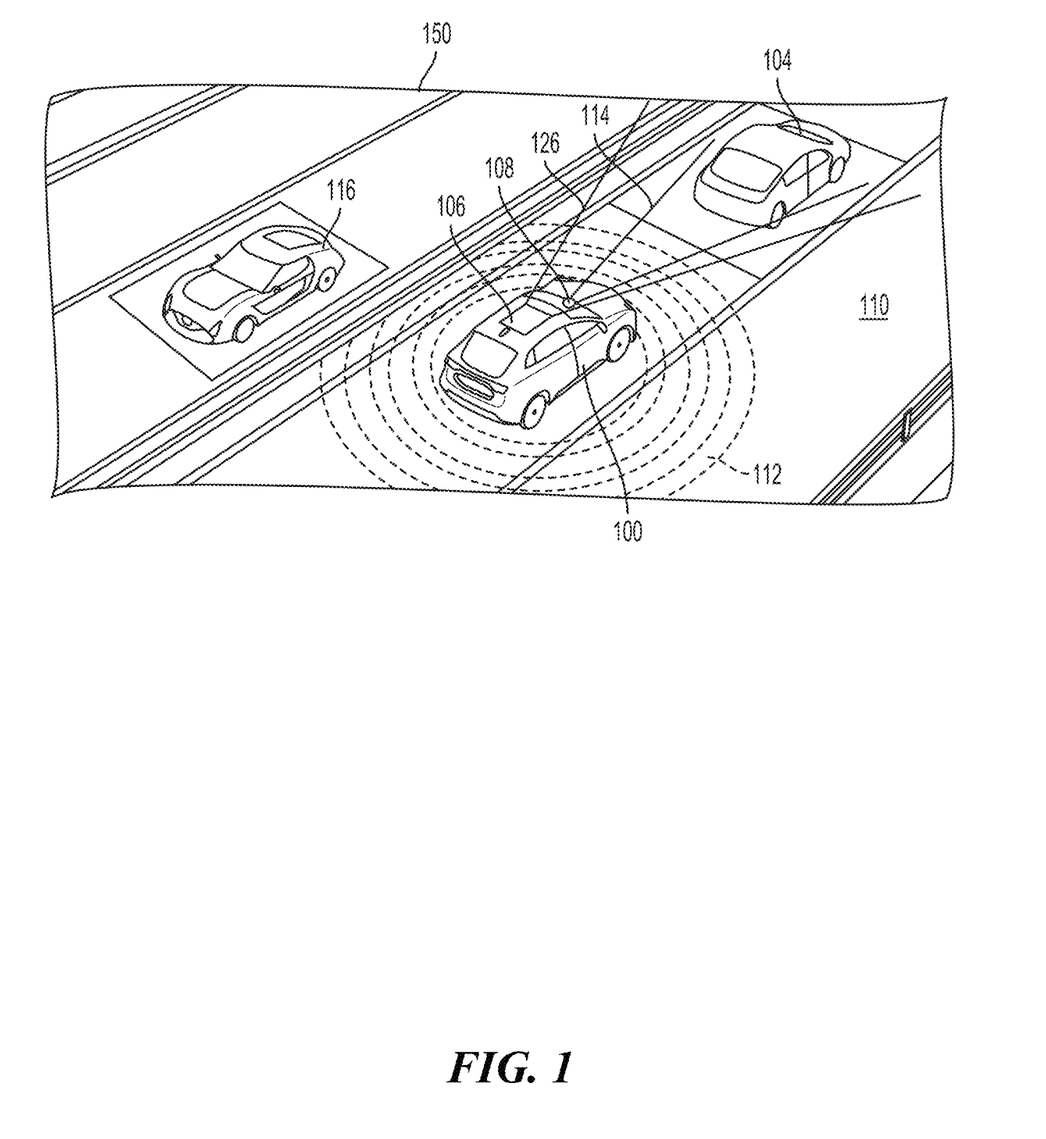
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As discussed, conventional systems use one or more sensors, such as LIDAR, to build 3D representations of a local environment. LIDAR sensors may provide reliable and accurate range data at large distances. A LIDAR sensor may be used for a variety of applications, such as mapping, localization, object detection, and collision avoidance.

Still, due to their cost, LIDAR sensors may not be economically viable. Additionally, a LIDAR sensor's 3D reconstruction may be sparse. Cameras, such as a red-green-blue (RGB) camera, may provide a dense texture information and a spatial understanding of the scene by reasoning across space and time. Additionally, cameras may be more economically viable in comparison to LIDAR sensors.

Aspects of the present disclosure are directed to a system for training and using a depth network to build 3D representation from one or more images captured by a single camera. In one configuration, the self-supervised training for image-based depth estimation leverages geometric constraints inherent in robots.

In one configuration, depth and ego-motion are estimated from monocular camera imagery. Aspects of the present disclosure improve monocular depth estimates generated from a depth network trained in a self-supervised manner. Improved monocular depth estimates bridge a gap between LIDAR and vision solutions, such that cameras may augment, complement, or substitute range sensors (e.g., LIDAR sensors).

The bridged gap may reduce costs and provide an increased number of robust solutions because cameras compliment range sensor functionality. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, cameras may produce a greater amount of image data in comparison to LIDAR data. The image data may be used as training data for a depth network. As such, the use of a monocular sensor may increase the amount of training data, thereby improving self-supervised monocular depth estimates.

In the current disclosure, unless otherwise noted, a self-supervised monocular depth network refers to a depth network trained in a self-supervised manner to generate a 3D representation from a single-camera. Self-supervised training refers to learning from raw input data without any ground-truth information. The self-supervised monocular depth network may also be referred to as a self-supervised single-camera depth network. The self-supervised monocular depth network may recover depth if a camera's motion is estimated between timesteps (e.g., frames).

A supervised monocular depth network refers to a depth network trained in a supervised manner. The supervised monocular depth network learns an estimation function by regressing input images to estimated depth outputs. In supervised training, the network learns from labeled ground-truth information. For example, supervised monocular depth networks may use ground truth depth (e.g., LIDAR data) to train a neural network as a regression model. As such, the monocular depth network does not estimate the camera's motion during supervised training.

In a supervised depth network, a convolutional neural network generates an initial coarse prediction and refines the prediction using another neural network to produce more accurate results. As supervised techniques for depth estimation advance, the availability of target depth labels is reduced due to the costs of generating labeled data. For example, a task of manually labeling outdoor scenes is time consuming.

As discussed, depth estimates may be used to reconstruct a scene. Conventional systems may generate depth estimates from monocular images. However, these systems do not model uncertainty measurements when estimating depth. Modeling uncertainty measurements may improve an accuracy of a depth network's estimates.

In most cases, a neural network (e.g., a depth network) may model aleatoric uncertainty and/or epistemic uncertainty. Epistemic uncertainty may be modeled using a dropout to approximate variational Bayesian inference. Aleatoric uncertainty may be modeled by extending a loss function to incorporate an extra output of the depth network. The modeled uncertainties may be propagated during the learning process.

The propagation may include masking out a photometric loss to remove areas with high uncertainty, actively sampling images to focus on images with increased uncertainty, and/or enforcing smoothness-sharpness constraints in different areas of the image.

The uncertainty may be learned in a self-supervised manner. In one configuration, self-supervised view synthesis training may incorporate the uncertainty. For example, the uncertainty may be propagated to the reconstructed image.

Conventional convolutional architectures use striding and pooling to increase field sizes. The striding and pooling may decrease model performance for tasks requiring fine-grained representations. Additionally, conventional upsampling processes fail to propagate and preserve sufficient details at the decoder layers, thereby reducing the accuracy of depth predictions.

In contrast to conventional convolutional architectures, aspects of the present disclosure implement an encoder-decoder architecture with 3D packing and unpacking blocks. In one configuration, the packing and unpacking blocks downsample and upsample feature maps during the encoding and decoding stages. Additionally, the packing and unpacking blocks learn to jointly preserve and recover spatial information for depth estimation.

In one configuration, a packing block folds the spatial dimensions of convolutional feature maps into additional feature channels. That is, the feature space is concatenated. The resulting tensor is at a reduced resolution. In contrast to striding or pooling, the spatial dimension transformation is invertible and comes at no loss. Next, the concatenated feature space is compressed to reduce its dimensionality to a desired number of output channels. Specifically, the concatenated feature space is expanded via a 3D convolutional layer. The resulting higher dimensional feature space is then flattened via reshaping before applying the final 2D convolutional contraction.

The unpacking block may decompress and unfold packed convolutional feature channels back to higher resolution spatial dimensions during the decoding process. The unpacking block replaces convolutional feature upsampling, typically performed via nearest-neighbor or with learnable transposed convolutional weights. The unpacking process reverses the 3D packing process performed by the encoder.

During the unpacking process, a 2D convolutional layer produces the required number of feature channels for a subsequent 3D convolutional layer. The 3D convolution expands the compressed spatial features. The unpacked features are then converted back to spatial details via a reshape operation to obtain a tensor with the desired number of output channels and target higher resolution.

Figure 2A:
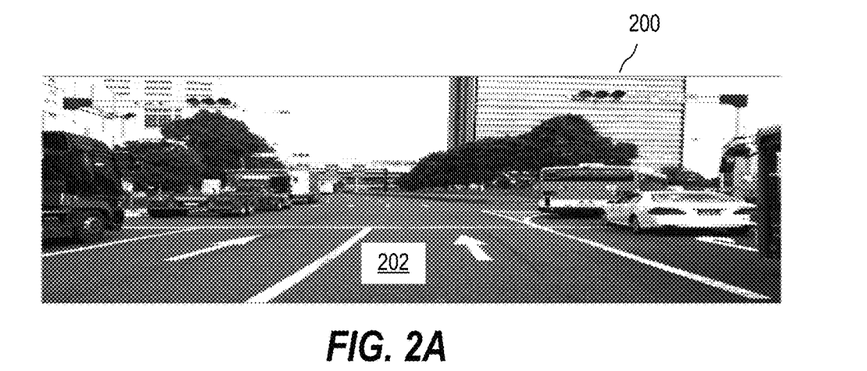
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
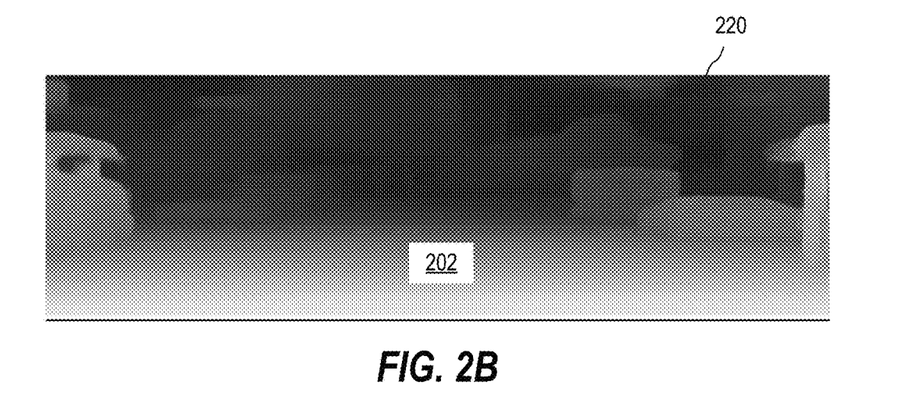
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
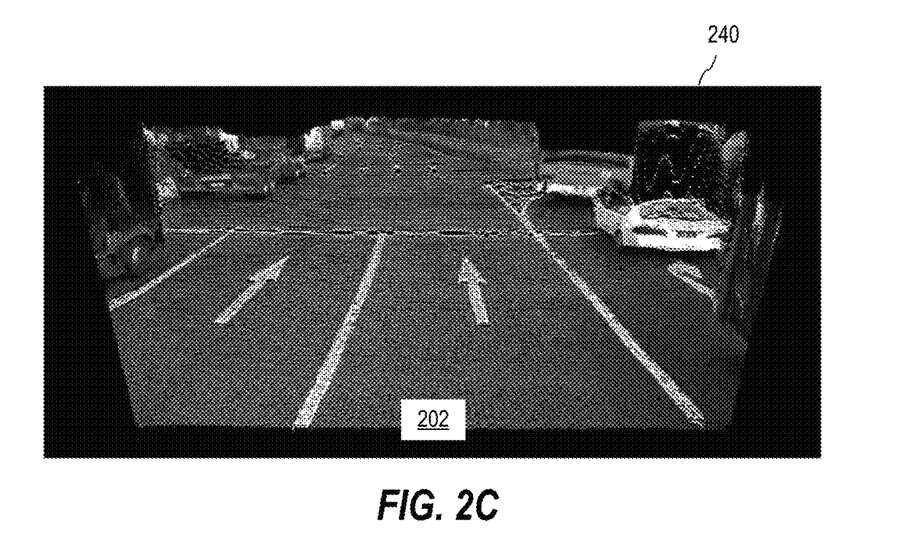
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

Figure 3:
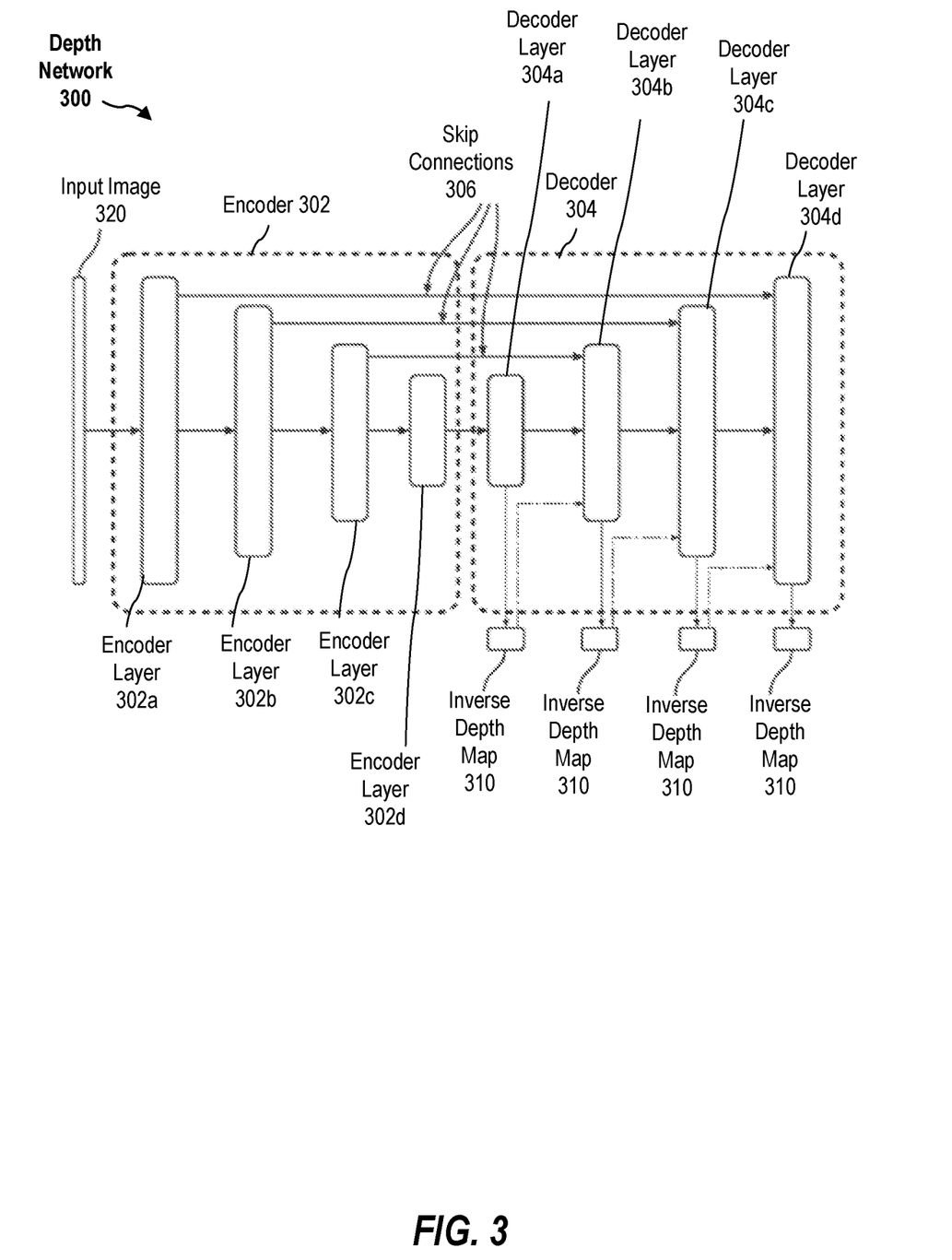
FIG. 3 illustrates an example of a depth network according to aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2B, of an input image 320.

The encoder 302 includes multiple encoder layers 302a-d. Each encoder layer 302a-d may be a packing layer for downsampling features during the encoding process. The decoder 304 includes multiple decoder layers 304a-d. In FIG. 3, each decoder layer 304a-d may be an unpacking layer for upsampling features during the decoding process. That is, each decoder layer 304a-d may unpack a received feature map.

Skip connections 306 transmit activations and gradients between encoder layers 302a-d and decoder layers 304a-d. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 302a-d may generate intermediate inverse depth maps 310. Each intermediate inverse depth map 310 may be upsampled before being concatenated with a corresponding skip connection 306 and feature maps unpacked by a corresponding decoder layer 302a-d. The inverse depth maps 310 also serve as the output of the depth network from which the loss is calculated. In contrast to conventional systems that incrementally super-resolve each inverse depth map 310. Aspects of the present disclosure upsample each inverse depth map 310 to a highest resolution using bilinear interpolation. Upsampling to the highest resolution reduces copy-based artifacts and photometric ambiguity, thus improving depth estimates.

Figure 4:
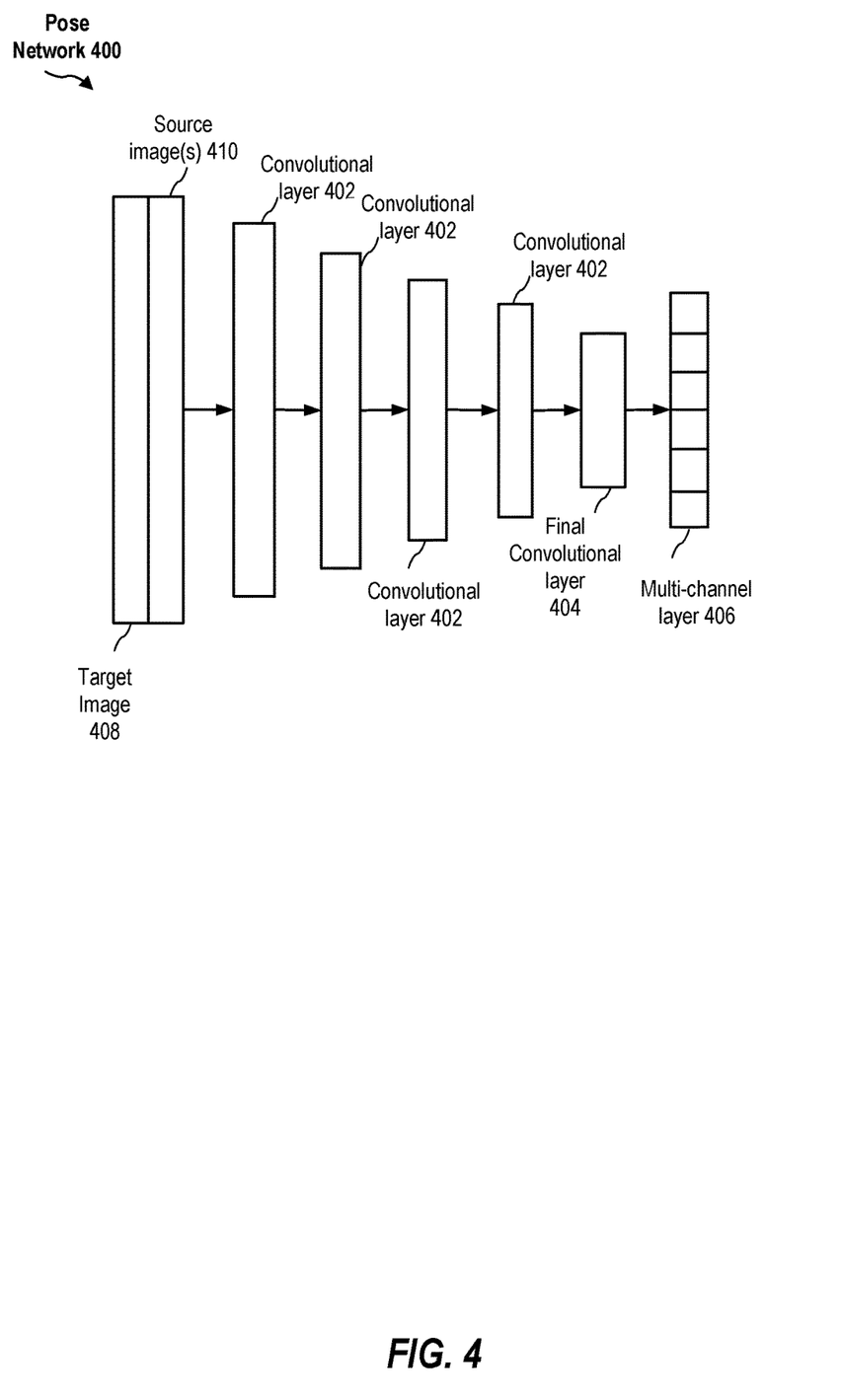
FIG. 4 illustrates an example of a pose network according to aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks.

As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel layer 406 may be a six-channel layer.

In one configuration, a target image ($I_t$) 408 and a source image ($I_s$) 410 are input to the pose network 400. The target image 408 and source image 410 may be concatenated when input to the pose network 400. During training, one or more source images 410 may be used during different training epochs. The source images 410 may include an image at a previous time step (t−1) and an image at a subsequent time step (t+1). The output is a set of six degrees of freedom (DoF) transformations between the target image 408 and the source image 410. The process may be repeated for each source image 410 if more than one source image 410 is considered.

Figure 5:
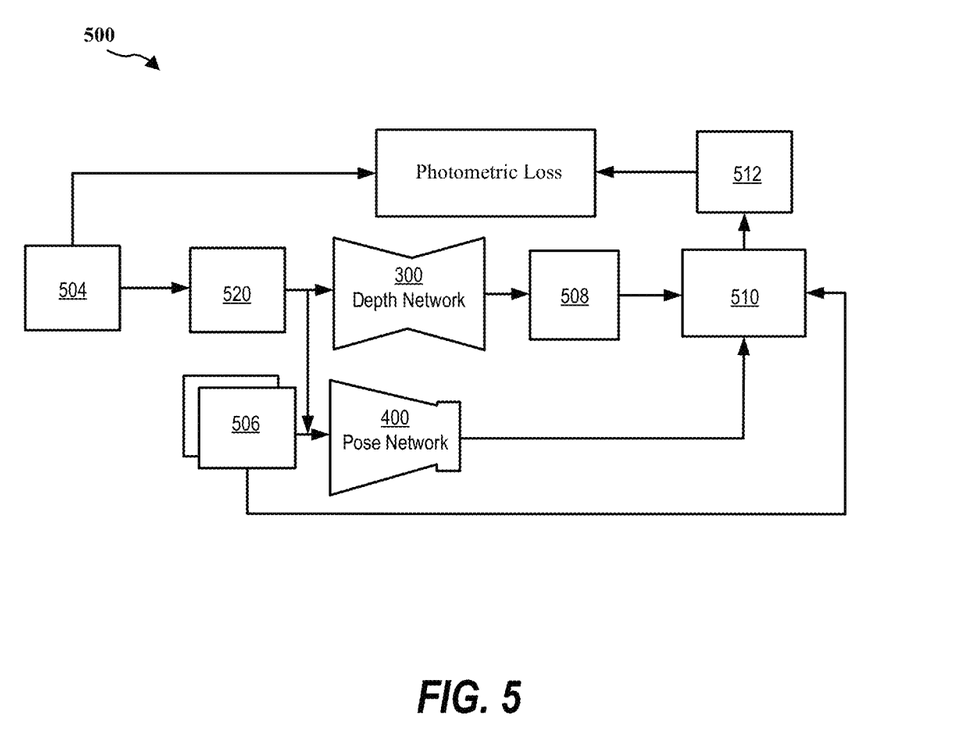
FIG. 5 illustrates an example of a training pipeline according to aspects of the present disclosure.

FIG. 5 illustrates an example of a training pipeline 500 according to aspects of the present disclosure. As shown in FIG. 5, the training pipeline 500 trains the depth network 300 from FIG. 3 and the pose network 400 from FIG. 4. The depth network 300 receives a target image ($I_t$) 504. The pose network 400 receives the target image 504 and source images ($I_s$) 506. The source images 506 are also referred to as context images.

As shown in FIG. 5, the depth network 300 generates a depth map ($\hat{D}_r$) 508 of the target image 504. As discussed, the depth map 508 may be a per-pixel depth map. A view estimation module 510 receives the per-pixel depth map 508 and the set of six DoF transformation (e.g., relative pose) between the target image 504 and the source image 506. The view estimation module 510 inverse warps the source image 506 to reconstruct the target image 506. The reconstructed target image 506 may be referred to as the first warped target image 512 ($\hat{I}_t$).

Specifically, the view estimation module 510 generates the first warped target image 512 by sampling pixels from the source image 506 based on the predicted depth map 508 and the set of six DoF transformations. For example, each point (e.g., pixel) in the target image 504 is projected on the source image 506 based on the predicted depth map 508 and camera pose. Bilinear interpolation may be used to obtain the projected coordinates of the pixel in the first warped target image 512. The color of the pixel in the warped target image may be based on neighboring pixels. The first warped target image 512 may be a 3D reconstruction of a 2D target image.

As shown in FIG. 5, the training pipeline 500 determines a photometric loss 516 based on a comparison of the first warped target image 512 and the target image 506. The photometric loss 516 may be used to update the depth network 300, the view estimation module 510, and/or the pose network 400.

In some implementations, the training pipeline 500 determines the uncertainty based on a variance in a Gaussian distribution for each pixel in an image. In some such implementations, an uncertainty threshold may be set to a pre-determined value. The value may be determined based on a desired level of uncertainty or a desired network accuracy. Pixels with an uncertainty (e.g., variance) that is greater than the uncertainty threshold may be removed from the training pipeline. In one configuration, a masking module 520 masks the pixels from the target image 504 to remove areas with high uncertainty.

In other such implementations, the loss value determined by the photometric loss may be weighed by the variance of each pixel. As such, pixels with a higher variance contribute less to the loss calculation. The weight may be determined based on heuristics. In some examples, the weight may be determined by dividing the loss by the variance. Other functions may be used for determining the weight.

Additionally, or alternatively, active sampling may be performed to focus on images with high uncertainty. The active sampling may select the target images 506 with high uncertainty. In some implementations, a global uncertainty value may be determined for the image. For example, the global uncertainty value may be an average variance of all pixels in the image. Images with a global uncertainty value (e.g., global variance) that is greater than a threshold may not be incorrectly modeled by the network. In such implementations, a probability for sampling images with the global uncertainty value that is greater than a threshold is higher than a probability for sampling images with the global uncertainty value that is less than a threshold. As such, the images with a higher globally uncertainty are more often sampled at training time. By training the network on images with a higher uncertainty, the network is more robust to uncertainty when in a test phase (e.g., real-world scenario). Such implementations may also reduce uncertainty in the trained network.

In another configuration, in addition to, or alternate from masking and/or active sampling, the pipeline may enforce smoothness-sharpness constraints in different areas of the image. Generally, low texture areas are smoother than high texture areas, because the low texture areas may correspond to a same object. Areas with sudden texture discontinuities may be sharper because they may correspond to object and depth changes. In depth discontinuities, depth information is more uncertain. In some implementations, the depth information, or other information, may constrain a sharpness or a smoothness of an area.

Figure 6:
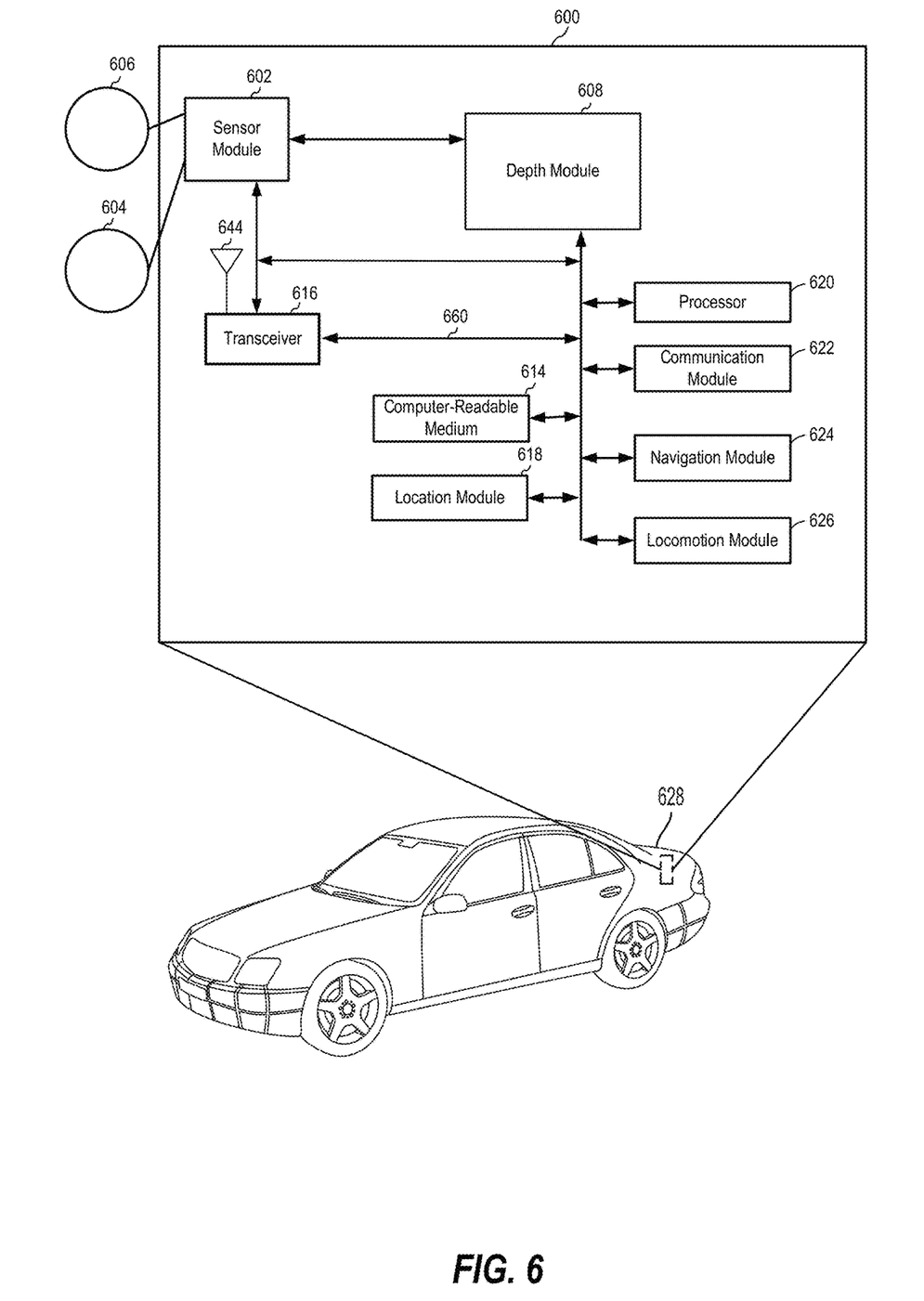
FIG. 6 is a diagram illustrating an example of a hardware implementation for an depth estimation system, in accordance with aspects of the present disclosure.

FIG. 6 is a diagram illustrating an example of a hardware implementation for an depth estimation system 600, according to aspects of the present disclosure. The depth estimation system 600 may be a component of a vehicle, a robotic device, or another device, such as the ego vehicle 100 described with reference to FIG. 1. In the example of FIG. 6, the depth estimation system 600 is a component of a vehicle 628. Aspects of the present disclosure are not limited to the depth estimation system 600 being a component of the vehicle 628, as other types of agents, such as a bus, boat, drone, or robot, are also contemplated for using the depth estimation system 600. In some examples, the depth estimation system 600 is configured to perform operations including operations of the process 900 described below with reference to FIG. 9.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The depth estimation system 600 may be implemented with a bus architecture, represented generally by a bus 660. The bus 660 may include any number of interconnecting buses and bridges depending on the specific application of the depth estimation system 600 and the overall design constraints. The bus 660 links together various circuits including one or more processors and/or hardware modules, represented by a processor 620, a communication module 622, a location module 618, a sensor module 602, a locomotion module 626, a navigation module 624, and a computer-readable medium 614. The bus 460 may also link various other circuits such as timing sources, peripherals, voltage regulators, and power management circuits, which are well known in the art, and therefore, will not be described any further.

The depth estimation system 600 includes a transceiver 616 coupled to the processor 620, the sensor module 602, a depth module 608, the communication module 622, the location module 618, the locomotion module 626, the navigation module 624, and the computer-readable medium 614. In some examples, the depth estimation system 600 can include a chip, SoC, chipset, package, or device that includes at least one processor and at least one modem (for example, a fifth generation (5G) new radio (NR) modem or other cellular modem). In some examples, the depth estimation system 600, or its sub-components, may be separate and distinct components. In some examples, one or more of the transceiver 616, the processor 620, the sensor module 602, the depth module 608, the communication module 622, the location module 618, the locomotion module 626, the navigation module 624, are implemented, at least in part, as software stored in one or more of a memory (not shown in FIG. 6) or the computer-readable medium 614. The memory may be a component of the depth estimation system 600 or the vehicle 628. For example, portions of one or more of the components of transceiver 616, the sensor module 602, the depth module 608, the communication module 622, the location module 618, the locomotion module 626, the navigation module 624 can be implemented as non-transitory code stored in the computer-readable medium 614 and executable by the processor 620 to perform the functions or operations of the respective component.

The transceiver 616 is coupled to an antenna 644. The transceiver 616 communicates with various other devices over one or more communication networks, such as an infrastructure network, a V2V network, a V2I network, a V2X network, a V2P network, or another type of network.

The depth estimation system 600 includes the processor 620 coupled to the computer-readable medium 614. The processor 620 performs processing, including the execution of software stored on the computer-readable medium 614 providing functionality according to the disclosure. As described, the software, when executed by the processor 620, causes the depth estimation system 600 to perform the various functions described for a particular device, such as the vehicle 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the depth module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 4G, 5G NR, etc. The communication module 622 may also be used to communicate with other components of the vehicle 628 that are not modules of the depth estimation system 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The depth estimation system 600 also includes the navigation module 624 for planning a route or controlling the locomotion of the vehicle 628, via the locomotion module 626. The navigation module 624 may override user input when the user input is expected (e.g., predicted) to cause a collision. The modules may be software modules running in the processor 620, resident/stored in the computer-readable medium 614, one or more hardware modules coupled to the processor 620, or some combination thereof.

The depth module 608 may be an example of aspects of the training pipeline 500, the depth network 300, and the pose network 400 as described with reference to FIGS. 3-5. The depth module 608 may operate in conjunction with one or more of the sensor module 602, the transceiver 616, the processor 620, the communication module 622, the location module 618, the locomotion module 626, the navigation module 624, and the computer-readable medium 614. The depth module 608 may be an neural network, or a component of the artificial neural network. The depth module 608 may be trained to reconstruct a 3D image of a scene based on one or more monocular 2D images of the scene. According to aspects of the present disclosure, the depth module 608 is trained to account for depth uncertainty when reconstruction the 3D image.

In some implementations, the depth module 608 may be configured for estimating an ego-motion of an agent based on a current image from a sequence of images and one or more previous images from the sequence of images. The ego-motion may be estimated via a pose network, such as the pose network 400 as described in FIG. 4. Each image in the sequence of images may be a 2D image. The 2D image may be an example of the target image 200 as described in FIG. 2A. The sequence of images may be obtained by one or more of the sensors 604 and 606 and the sensor module 602.

The depth module 608 may also estimate a depth of the current image based on the previous image. The estimated depth may be an example of the depth map 220 as described in FIG. 2B. The estimated depth may account for a depth uncertainty measurement in the current image and the at least one previous image. The depth module 608 may be trained to account for the uncertainty. A training pipeline, such as the training pipeline 500 as describe in FIG. 5, may train the depth module 608. During testing (e.g., real-world deployment), one or both of the photometric loss calculation, such as the photometric loss 516 as described in FIG. 5, or the masking module 520 may be disabled or removed.

The depth module 608 may generate a 3D reconstruction of the current image based on the estimated ego-motion and the estimated depth. A view estimation module, such as the view estimation module 510 as described in FIG. 5, of the depth module 608 may generate the 3D reconstruction.

Working in conjunction with one or more of the navigation module 624, locomotion module 626, location module 618, and processor 620, the depth module 608 may control an action of the agent based on the 3D reconstruction. The 3D reconstruction may be an example of the 3D reconstruction 240 as described in FIG. 2C.

Figure 7:
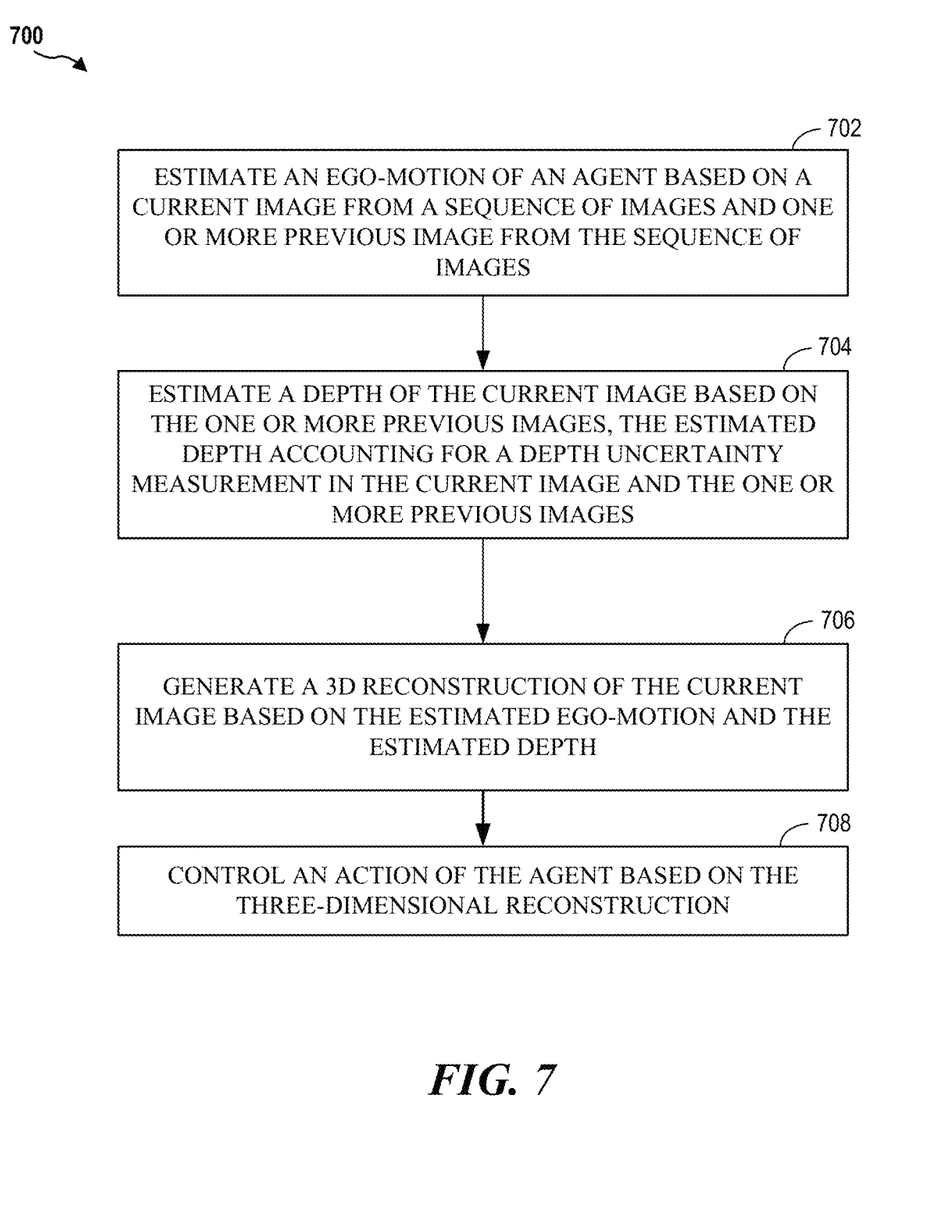
FIG. 7 is a diagram illustrating an example process performed, for example, by an agent, in accordance with various aspects of the present disclosure.

FIG. 7 is a diagram illustrating an example process 700 performed, for example, by an agent, in accordance with various aspects of the present disclosure. The example process 700 supports generating a three-dimensional (3D) reconstruction of the current image based on the estimated ego-motion and the estimated depth. where the estimated depth accounts for a depth uncertainty measurement in the current image and one or more previous images. in accordance with aspects of the present disclosure. The operations of the process 700 may be implemented by a vehicle, such as the vehicles 100 and 628, or its components, as described with reference to FIGS. 1 and 6. For example, operations of the process 700 may be performed by a depth module 608 as described with reference to FIG. 6. In some examples, an agent may execute a set of instructions to control the functional elements of the agent to perform the operations or functions described below. Additionally, or alternatively, the agent may perform aspects of the operations or functions described below using special-purpose hardware.

In block 702, the agent estimates an ego-motion of the agent based on a current image from a sequence of images one or more previous images from the sequence of images. Each image in the sequence of images may be a 2D image. The sequence of images may be captured via a monocular camera defined on the agent. That is, the monocular camera may be integrated with the agent.

In block 704, the agent estimates a depth of the current image based the one or more previous images. The estimated depth may account for depth uncertainty measurements in the current image and the one or more previous images. The uncertainty measurement may include aleatoric or epistemic uncertainty. In block 706, the agent generates a 3D reconstruction of the current image based on the estimated ego-motion and the estimated depth. Additionally, in block 708, the agent controls an action of the agent based on the 3D reconstruction.

In some implementations, the agent trains a neural network to account or the uncertainty measurement. The neural network may be trained by one or more of masking out a photometric loss, actively sampling images from a sequence of training images; or enforcing smoothness-sharpness constraints in different areas of the current image and the sequence of images. The training may be performed according to a training pipeline 500 as described in FIG. 5. The neural network may be trained on a remote device and shared with the agent.

In some such implementations, the neural network is trained to mask out the photometric loss by determining a variance of each pixel in a training image and masking each pixel in the training image with the variance greater than a variance threshold. In other such implementations, the neural network is trained to actively sample the images by determining a global uncertainty for each image in the sequence of training images and increasing a sampling probability for each image with the global uncertainty that is greater than a global uncertainty threshold. In yet other such implementations, the neural network is trained to enforce smoothness-sharpness constraints by constraining a smoothness value for each pixel in a training image and constraining a sharpness value for each pixel in the training image.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method three-dimensional (3D) scene reconstruction by an agent, comprising:
estimating an ego-motion of the agent based on a current image from a sequence of images and a previous image from the sequence of images, each image in the sequence of images being a two-dimensional (2D) image, and the ego-motion comprising a six degrees of freedom transformation between the current image and the previous image;
estimating a depth of the current image via a depth estimation model, the depth estimation model previously trained to account for a depth uncertainty measurement in the current image, the depth estimation model comprising a plurality of encoder layers and a plurality of decoder layers, each decoder layer generating an intermediate depth map, each intermediate depth map being upsampled and then concatenated with both activations of a corresponding encoder layer and feature maps unpacked by a corresponding decoder layer, and the activations being transmitted via a skip connection from the corresponding encoder layer;
generating a 3D reconstruction of the current image based on the estimated ego-motion and the estimated depth; and
controlling an action of the agent based on the three-dimensional reconstruction.

2. The method of claim 1, further comprising training the depth estimation model to account or the uncertainty measurement by one or more of:
masking out a photometric loss;
actively sampling images from a sequence of training images to focus on images with the high uncertainty; or
enforcing smoothness-sharpness constraints in different areas of the current image and the sequence of images.

3. The method of claim 2, in which masking out the photometric loss comprises:
determining a variance of each pixel in a training image; and
masking each pixel in the training image with the variance greater than a variance threshold.

4. The method of claim 2, in which actively sampling the images comprises:
determining a global uncertainty for each image in the sequence of training images;
increasing a sampling probability for each image with the global uncertainty that is greater than a global uncertainty threshold, and
the method further comprises sampling, during the training, images from the sequence of training images based on the sampling probability.

5. The method of claim 2, in which enforcing smoothness-sharpness constraints comprises constraining a smoothness value for each pixel in a training image and constraining a sharpness value for each pixel in the training image.

6. The method of claim 1, in which the uncertainty measurement comprises aleatoric or epistemic uncertainty.

7. The method of claim 1, further comprising capturing the sequence of images via a monocular camera defined on the agent.

8. An apparatus for three-dimensional (3D) scene reconstruction at an agent, comprising:
a processor;
a memory coupled with the processor; and
instructions stored in the memory and operable, when executed by the processor, to cause the apparatus:
to estimate an ego-motion of an agent based on a current image from a sequence of images and a previous image from the sequence of images, each image in the sequence of images being a two-dimensional (2D) image, and the ego-motion comprising a six degrees of freedom transformation between the current image and the previous image;
to estimate a depth of the current image via a depth estimation model, the depth estimation model previously trained to account for a depth uncertainty measurement in the current image, the depth estimation model generating an intermediate depth map at each decoder layer of a plurality of decoder layers, each intermediate depth map being upsampled and then concatenated with both activations of a corresponding encoder layer and feature maps unpacked by a corresponding decoder layer, and the activations being transmitted via a skip connection from the corresponding encoder layer;
to generate a 3D reconstruction of the current image based on the estimated ego-motion and the estimated depth; and
to control an action of the agent based on the three-dimensional reconstruction.

9. The apparatus of claim 8, in which execution of the instructions further cause the apparatus to train the depth estimation model to account for the uncertainty measurement by one or more of:
masking out a photometric loss;
actively sampling images from a sequence of training images to focus on images with the high uncertainty; or
enforcing smoothness-sharpness constraints in different areas of the current image and the sequence of images.

10. The apparatus of claim 9, in which masking out the photometric loss comprises: determining a variance of each pixel in a training image; and masking each pixel in the training image with the variance greater than a variance threshold.

11. The apparatus of claim 9, in which actively sampling the images comprises:
determining a global uncertainty for each image in the sequence of training images;
increasing a sampling probability for each image with the global uncertainty that is greater than a global uncertainty threshold, and
the apparatus further comprises sampling, during the training, images from the sequence of training images based on the sampling probability.

12. The apparatus of claim 9, in which enforcing smoothness-sharpness constraints comprises constraining a smoothness value for each pixel in a training image and constraining a sharpness value for each pixel in the training image.

13. The apparatus of claim 8, in which the uncertainty measurement comprises aleatoric or epistemic uncertainty.

14. The apparatus of claim 8, in which execution of the instructions further cause the apparatus to capture the sequence of images via a monocular camera defined on the agent.

15. A non-transitory computer-readable medium having program code recorded thereon for three-dimensional (3D) scene reconstruction at an agent the program code executed by a processor and comprising:
- program code to estimate an ego-motion of an agent based on a current image from a sequence of images and a previous image from the sequence of images, each image in the sequence of images being a two-dimensional (2D) image, and the ego-motion comprising a six degrees of freedom transformation between the current image and the previous image;
- program code to estimate a depth of the current image via a depth estimation model, the depth estimation model previously trained to account for a depth uncertainty measurement in the current image, the depth estimation model generating an intermediate depth map at each decoder layer of a plurality of decoder layers, each intermediate depth map being upsampled and then concatenated with both activations of a corresponding encoder layer and feature maps unpacked by a corresponding decoder layer, and the activations being transmitted via a skip connection from the corresponding encoder layer;
- program code to generate a 3D reconstruction of the current image based on the estimated ego-motion and the estimated depth; and
- program code to control an action of the agent based on the three-dimensional reconstruction.

16. The non-transitory computer-readable medium of claim 15, further comprising program code to train the depth estimation model to account for the uncertainty measurement, the program code to train the neural network comprising one or more of:
- program code to mask out a photometric loss;
- program code to actively sample images from a sequence of training images to focus on images with the high uncertainty; or
- program code to enforce smoothness-sharpness constraints in different areas of the current image and the sequence of images.

17. The non-transitory computer-readable medium of claim 16, in which the program code to mask out the photometric loss comprises:
- program code to determine a variance of each pixel in a training image; and
- program code to mask each pixel in the training image with the variance greater than a variance threshold.

18. The non-transitory computer-readable medium of claim 16, in which the program code to actively sample the images comprises:
- program code to determine a global uncertainty for each image in the sequence of training images;
- program code to increase a sampling probability for each image with the global uncertainty that is greater than a global uncertainty threshold, and
- the program code to train further comprises program code to sample, during the training, images from the sequence of training images based on the sampling probability.

19. The non-transitory computer-readable medium of claim 16, in which the program code to enforce the smoothness-sharpness constraints comprises program code to constrain a smoothness value for each pixel in a training image and program code to constrain a sharpness value for each pixel in the training image.

20. The non-transitory computer-readable medium of claim 15, in which the uncertainty measurement comprises aleatoric or epistemic uncertainty.

* * * * *